May 6, 1952     C. F. KEYS     2,595,269

WHEELED SHOPPING BAG

Filed May 17, 1949

CHESTER F. KEYS INVENTOR.

BY
Arnold and Mathie
his attorneys

Patented May 6, 1952

2,595,269

UNITED STATES PATENT OFFICE 2,595,269

WHEELED SHOPPING BAG

Chester F. Keys, Seattle, Wash.

Application May 17, 1949, Serial No. 93,657

2 Claims. (Cl. 280—51)

My invention relates to a wheeled shopping bag. More particularly my invention relates to a shopping bag equipped with wheels and a supporting rest.

An object of my invention is to provide a shopping bag which may be easily carried in the hand or under the arm of the shopper when not in use. This object requires that the bag be of such design that it can readily be folded into a compact bundle. It further requires that the shopping bag be of light weight.

Another object of my invention is to provide a mobile shopping bag which is easily wheeled and guided.

Another object of my invention is to provide a mobile shopping bag with a novel supporting rest so that the handle can be released by the shopper without danger of the shopping bag tipping and spilling its contents.

To achieve this compactness, mobility and stability, my invention accordingly comprises the features of construction, combination of elements and arrangement of parts which will be described in the construction hereinafter set forth, depicted in the accompanying drawings and set forth in the claims to follow.

The above-mentioned general objects of my invention, together with others inherent in the same, are attained by the device set forth in the accompanying drawings, throughout which drawings like reference numerals indicate like parts:

Figure 1:
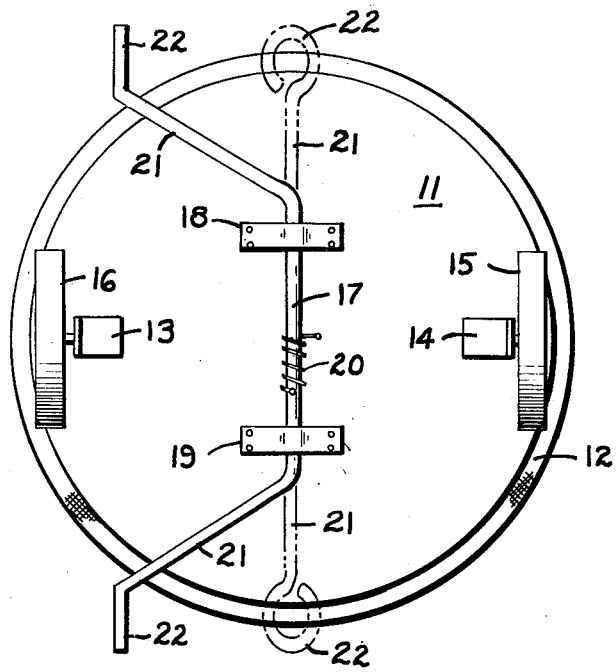
Figure 1 is a bottom plan view of the mobile shopping bag embodying my invention, with full lines showing the supporting rest in retracted position, and with broken lines showing the supporting rest in extended or supporting position.

Referring to Fig. 1, flat plate 11 preferably but not necessarily is of circular shape. It is formed of any suitable rigid material, such as wood or metal. Bag 12 is formed of fabric or other pliable material and is of a texture so that it will be sufficiently pliable so the same can be folded as hereinafter described. Also, the material is sufficiently stiff so that the bag has a tendency to stand erect and has good wear-resistant qualities.

An inner plate 24 is positioned on the inside of the bag 12 and the plate 11 is positioned on the outside. Thus by interconnecting plates 11 and 24 they are in turn suitably connected with the bag 12. While my invention is not limited to a base plate means comprising the double plate construction just described, the same is preferable and provides for a very sturdy construction. Also as the bag is preferably provided without a bottom opening there is little tendency of the bag to tear.

Brackets 13 and 14 are suitably connected with the plate 11 as by bolts passing through plate 11, bag 12, and plate 24. These brackets 13 and 14 rotatably mount wheels 15 and 16 and preferably with a common axis which is a diameter of plate 11. The brackets 13 and 14 mount the wheels 15 and 16 so that they are parallel to each other and are located toward the outer edge portion of plate 11. Such construction provides for maximum stability with minimum size.

Figures 2, 3:
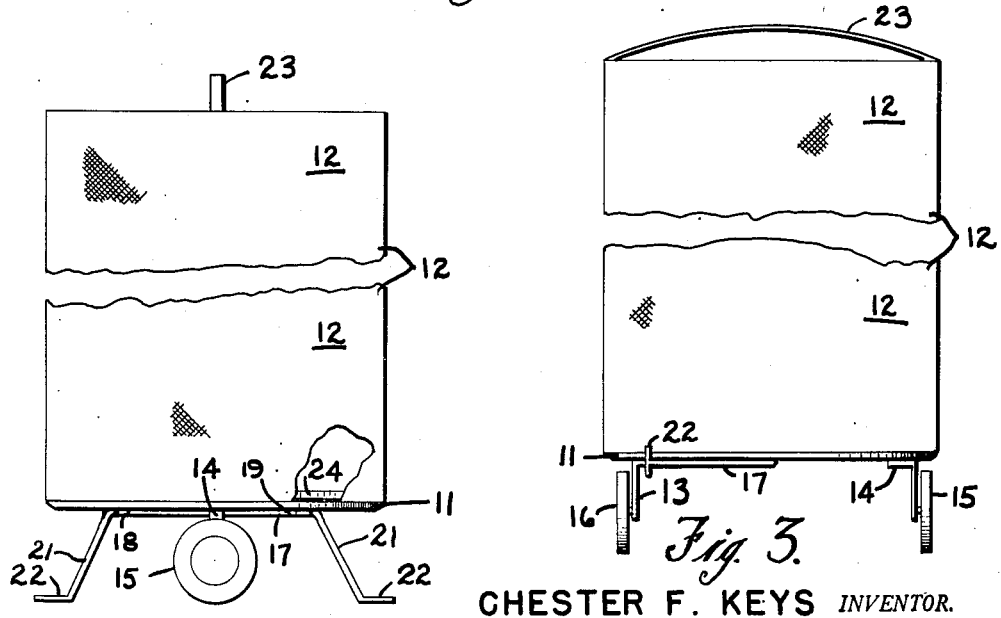
Fig. 2 is a fragmentary side elevational view on a reduced scale of the mobile shopping bag with a portion of the bag broken away and with the supporting rest in extended or supporting position.
Fig. 3 is a fragmentary end elevational view, also on a reduced scale, of the mobile shopping bag with the supporting rest shown in retracted position.

An angularly movable supporting rest 17 is shown by full lines in retracted position in Fig. 1 and by broken lines in its extended or supporting position. In Fig. 2 said supporting rest 17 is shown in supporting position while in Fig. 3 it is shown in retracted position. The supporting rest 17 comprises a central portion which is parallel to the base plate 11 and is mounted for pivotal movement in hangers 18 and 19. The supporting rest 17 is provided with angular portions 21, each of which carries a foot portion 22. Preferably, the supporting rest 17 is formed by bending a rod which is circular in section. The said feet 22 are preferably of a circular shape to provide an extended bearing surface to increase stability when the mobile shopping bag is left unattended. The feet 22 are parallel to the base plate 11 when they are in extended or supporting position, and they will thus be parallel and rest on any supporting surface when in such position.

The portions 21 of the supporting rest 17 normally lie against the bottom of plate member 11 by reason of spring 20. In the form illustrated, spring 20 is a coil spring surrounding the central portion of supporting rest 17 and having one end of such coil spring connected with the plate 11 and the other end thereof connected with the supporting rest 17. Obviously other types of resilient means may be employed to urge the supporting rest 17 to its raised position.

The spring 20 serves two functions. One is to maintain the leg portions 21 against the underside of the plate 11 so that a person using the device can release the supporting rest 17 by the use of a toe, and the other function is to provide a construction which can be folded to provide an object of minimum size as the mobile shopping bag is not being used but is being carried.

A strap 23 is sewn or otherwise suitably connected with the bag 12 so that the device may be manipulated, when in use, from said strap 23.

*Mode of operation*

The mobile shopping bag when empty is easily arranged for convenient under-arm carriage by folding the bag 12 about the plate 11. The spring 20 urges the supporting rest 17 flatly against the circular plate 11 to provide for a compact bundle.

On reaching the store or location where the device is to be employed, the user unfolds the bag 12 from about the plate 11 and trundles the mobile shopping bag along, transferring articles to the bag as may be desired. When the device is thus mobile, it will be noted that the supporting rest 17 is flatly against plate 11 and thus does not interfere with the rotation of wheels 15 and 16.

When it is desired to leave the mobile shopping bag unattended, the supporting rest 17 may be extended by the toe of the operator so that the feet 22 are flatly on the supporting surface. Due to the weight of the mobile shopping bag and the weight of articles therein, the tension of spring 20 is counteracted and the mobile shopping bag then stands with great stability upon a four-point support. This four-point support is provided by the wheels 15 and 16 and the feet 22. When the user desires to continue the trundling, it is only necessary to provide a slight upward pressure on the strap 23 so that the supporting rest 17 may be rotated under the influence of spring 20 and without interference from the supporting surface on which the mobile shopping bag previously rested.

As the wheels 15 and 16 are toward the perimeter of plate 11 they provide for utmost stability. Also, as they are axially aligned on a diameter of plate 11 and are parallel to each other, the device can be readily manipulated, all with a minimum weight to the mobile shopping bag. Similarly, the supporting rest 17, by having the feet 22 when in extended position, near the perimeter of plate 11 provides for a rest of maximum efficiency and of minimum weight.

Obviously, changes may be made in the form, dimensions, and arrangement of the parts of my invention, without departing from the principle thereof, the above setting forth only a preferred form of embodiment.

I claim:

1. A mobile shopping bag comprising base plate means, said base plate means comprising two circular plates; a bag secured between said circular plates and extending upwardly therefrom; two substantially parallel wheels each of which is mounted on an opposite edge portion of the lower of said circular plates and aligned with a common axis; an angularly movable U-shaped supporting rest connected with the lower of said circular plates and comprising a base rod portion pivoted to the underside of said base plate means, feet portions extending substantially parallel to the underside of said base plate means, and leg portions interconnecting said base rod portion and said feet portions, each of said feet portions being movable downwardly to substantially the level of the lowermost portions of said wheels; and resilient means urging said supporting rest upwardly and flatly against the bottom of the lower of said circular plates.

2. A mobile shopping bag comprising base plate means; a bag secured thereto and extending upwardly therefrom; two substantially parallel wheels each of which is mounted on an opposite edge portion of said base plate means and aligned with a common axis substantially intermediate said base plate means; an angularly movable U-shaped supporting rest connected with the lower surface of said base plate means and comprising a base rod portion pivoted to the underside of said base plate means substantially intermediate and at right angles to the axis of said wheels, feet portions extending substantially parallel to the underside of said base plate means, and leg portions interconnecting said base rod portion and said feet portions, each of said feet portions being movable downwardly to substantially the level of the lowermost portions of said wheels; and resilient means urging said supporting rest upwardly and flatly against the bottom of said base plate means.

CHESTER F. KEYS.

REFERENCES CITED

The following references are of record in the file of this patent:

UNITED STATES PATENTS

| Number | Name | Date |
|---|---|---|
| 973,029 | Froese | Oct. 18, 1910 |
| 1,013,605 | Lyon | Jan. 2, 1912 |
| 1,264,048 | Forster | Apr. 23, 1918 |
| 1,654,862 | Clyne | Jan. 3, 1928 |
| 2,078,119 | Benedict | Apr. 20, 1937 |

FOREIGN PATENTS

| Number | Country | Date |
|---|---|---|
| 157,958 | Great Britain | July 14, 1921 |